US008483695B2

(12) United States Patent
Nakahara

(10) Patent No.: US 8,483,695 B2
(45) Date of Patent: Jul. 9, 2013

(54) WIRELESS TERMINAL, WIRELESS CONTROLLER, CORE-NETWORK DEVICE, AND WIRELESS BASE STATION

(75) Inventor: Tohru Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 686 days.

(21) Appl. No.: 12/355,726

(22) Filed: Jan. 16, 2009

(65) Prior Publication Data

US 2009/0280820 A1 Nov. 12, 2009

(30) Foreign Application Priority Data

May 12, 2008 (JP) ................................ 2008-124136

(51) Int. Cl.
*H04W 72/00* (2009.01)
(52) U.S. Cl.
USPC ........................................ 455/450; 455/422.1
(58) Field of Classification Search
None
See application file for complete search history.

(56) References Cited

U.S. PATENT DOCUMENTS

| | | | |
|---|---|---|---|
| 5,572,221 A | 11/1996 | Marlevi et al. | |
| 5,825,759 A | 10/1998 | Liu | |
| 2003/0117953 A1 | 6/2003 | Kinahan et al. | |
| 2004/0136344 A1* | 7/2004 | Kim et al. ...................... | 370/335 |
| 2004/0137901 A1 | 7/2004 | Hamasaki et al. | |
| 2004/0264409 A1 | 12/2004 | Lee et al. | |
| 2004/0264428 A1 | 12/2004 | Choi et al. | |
| 2008/0075006 A1* | 3/2008 | Morita ........................... | 370/232 |
| 2008/0076420 A1 | 3/2008 | Khetawat et al. | |
| 2008/0171538 A1 | 7/2008 | Naito et al. | |
| 2009/0061873 A1* | 3/2009 | Bao et al. ....................... | 455/436 |
| 2009/0164547 A1* | 6/2009 | Ch'ng et al. ................... | 709/201 |
| 2010/0113038 A1* | 5/2010 | Eskicioglu et al. ............ | 455/446 |

FOREIGN PATENT DOCUMENTS

| | | |
|---|---|---|
| EP | 1 317 103 | 6/2003 |
| EP | 1 347 614 | 9/2003 |
| EP | 1 835 667 | 9/2007 |
| JP | 02-262729 | 10/1990 |

(Continued)

OTHER PUBLICATIONS

Extended European Search Report with Written Opinion and Abstract, issued by the European Patent Office for corresponding European Patent Application No. 09150160.1, dated Jul. 18, 2011.

(Continued)

*Primary Examiner* — Ajit Patel
*Assistant Examiner* — Shantell L Heiber
(74) *Attorney, Agent, or Firm* — Myers Wolin, LLC

(57) ABSTRACT

In a wireless terminal, a receiver receives information being broadcasted from a wireless base station as a femtocell and indicating that the wireless base station is a femtocell, and a transmitter transmits to the wireless base station a signal of a first request to secure one or more wireless resources when the receiver receives the information before the wireless terminal receives a call and a request to initiate a call. When the wireless terminal receives a second request to initiate a call, the wireless terminal performs operations for establishing a communication path by using the one or more wireless resources secured in response to the first request, where the operations do not include an operation for securing the one or more wireless resources. Therefore, it is possible to reduce the time taken to start communication after the user of the wireless terminal requests the start of the communication.

1 Claim, 12 Drawing Sheets

FOREIGN PATENT DOCUMENTS

| | | |
|---|---|---|
| JP | 06-121373 A | 4/1994 |
| JP | 2000-502521 A | 2/2000 |
| WO | 97/04611 | 2/1997 |
| WO | 2005/094096 | 10/2005 |
| WO | 2005/094111 | 10/2005 |
| WO | 2007/040454 | 4/2007 |
| WO | 2007/136339 | 11/2007 |
| WO | WO 2007/136339 * | 11/2007 |
| WO | 2008/055251 | 5/2008 |

OTHER PUBLICATIONS

Partial European Search Report with written opinion issued by the European Patent Office for corresponding European Patent Application No. 09150160.1, mailed Apr. 19, 2011.

Office Action issued for corresponding Japanese Patent Application No. 2008-124136 issued on Jun. 19, 2012 with partial English translation.

* cited by examiner

WIRELESS TERMINAL, WIRELESS CONTROLLER, CORE-NETWORK DEVICE, AND WIRELESS BASE STATION

CROSS-REFERENCE TO RELATED APPLICATIONS

This application is based on and claims the benefits of priority from the prior Japanese Patent Application No. 2008-124136, filed on May 12, 2008, the contents of which are incorporated herein by reference.

BACKGROUND OF THE INVENTION

1. Field of the Invention

The present invention relates to a wireless terminal, a wireless controller, a core-network device, and a wireless base station, which are specifically used for wireless communication through a femtocell.

2. Description of the Related Art

Currently, femtocells are beginning to be used in the field of wireless communication. Each femtocell covers a small area (cell), so that the dead zone of the electromagnetic wave in a house or an office can be eliminated, and exclusive use of one or more wireless resources is allowed. Therefore, wireless communication using femtocells enable more stable securement of high-speed communication than the conventional wireless communication.

When a user starts femtocell-based communication, for example, the user presses down a call button on a wireless terminal such as a mobile phone. The wireless terminal starts processing for call connection when the call button is pressed down.

The processing for call connection is constituted by wireless-link connection between the wireless terminal and a RAN (radio access network) and wireless-access-line connection between the wireless terminal and a CN (core network). Specifically, when the wireless terminal receives from the user a request to start a communication (communication-start request), the wireless terminal establishes a wireless link with the RAN through a wireless base station (Node B) arranged for femtocell-based communication. Then, the wireless terminal and the CN perform processing for authentication and concealed communication through the Node B and an RNC (radio network controller), and establishes a wireless access line between the wireless terminal and the CN. Thus, the wireless terminal can perform communication with an opposite party.

In a previously proposed network service system, an area to which a mobile body is to move is predicted, and communication resources are allocated in advance, as disclosed, for example, in Japanese Unexamined Patent Publication No. 2000-502521. In addition, in a previously proposed channel reservation system, when the reception level, at a wireless terminal, of a signal from a base station in a first area adjacent to a second area in which the mobile terminal currently exists exceeds a predetermined level, a reservation for the mobile terminal is made so that the traffic from or to the mobile terminal is not interrupted by movement of the mobile terminal from the second area to the first area, as disclosed, for example, in Japanese Unexamined Patent Publication No. 6-121373.

However, in the systems in which a wireless link and a wireless access line are established after reception of a communication-start request from a user, it takes much time until the communication is started.

SUMMARY OF THE INVENTION

The present invention is made in view of the above problems, and the object of the present invention is to provide a wireless terminal, a wireless controller, a core-network device, and a wireless base station which can reduce the time taken to start communication after a user's request for the communication.

In order to accomplish the above object, according to the first aspect of the present invention, a wireless terminal is provided. The wireless terminal according to the first aspect of the present invention comprises: a receiver which receives information being broadcasted from a wireless base station as a femtocell and indicating that the wireless base station is a femtocell; and a transmitter which transmits to the wireless base station a signal of a first request to secure one or more wireless resources when the receiver receives the information before the wireless terminal receives a call and a request to initiate a call. When the wireless terminal receives a second request to initiate a call, the wireless terminal performs operations for establishing a communication path by using the one or more wireless resources secured in response to the first request, where the operations do not include an operation for securing the one or more wireless resources.

In order to accomplish the aforementioned object, according to the second aspect of the present invention, a wireless terminal which performs wireless communication is provided. The wireless terminal according to the second aspect of the present invention comprises: a broadcast-information reception unit which receives information broadcasted from a wireless base station; and a wireless-link establishment unit which establishes a wireless link between the wireless terminal and a wireless controller when the information contains a piece indicating that the wireless base station is a femtocell, where the wireless controller controls the wireless base station.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Preferred embodiments of the present invention will be explained below with reference to the accompanying drawings, wherein like reference numbers refer to like elements throughout.

1. Basic Construction

Figure 1:
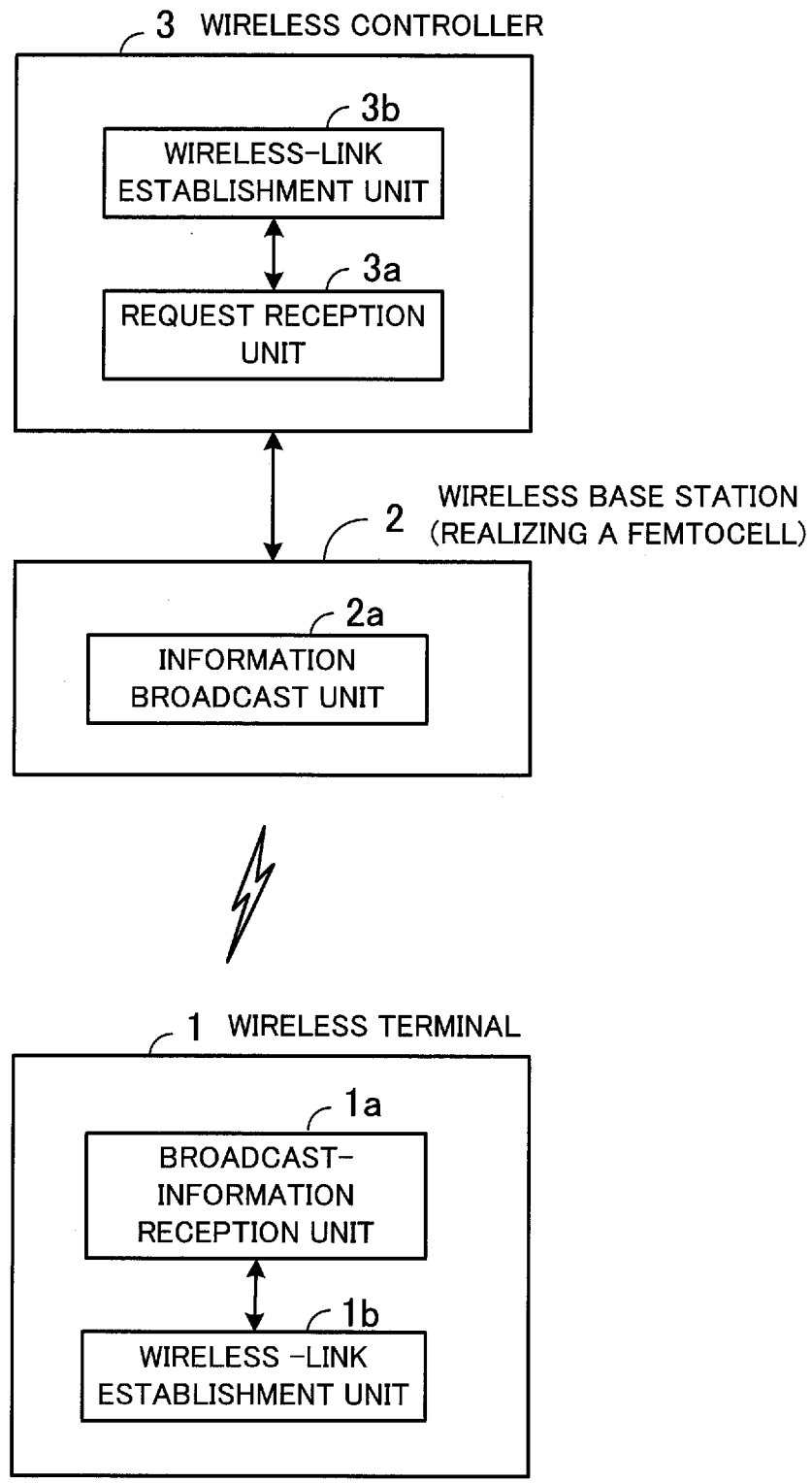
FIG. 1 is a diagram illustrating the basic constructions of a wireless terminal, a wireless base station, and a wireless controller according to the present invention.

FIG. 1 is a diagram illustrating the basic constructions of a wireless terminal, a wireless base station, and a wireless controller in a mobile-communication network according to the present invention. As illustrated in FIG. 1, the wireless terminal 1 comprises a broadcast-information reception unit 1a and a wireless-link establishment unit 1b, and the wireless base station 2 comprises an information broadcast unit 2a. In addition, the wireless controller 3 comprises a link-request reception unit 3a and a wireless-link establishment unit 3b.

The wireless base station 2 realizes a femtocell, and the information broadcast unit 2a in the wireless base station 2 broadcasts information which contains a piece indicating that the wireless base station 2 is a femtocell.

The broadcast-information reception unit 1a in the wireless terminal 1 receives the information broadcasted from the wireless base station 2. When the broadcasted information received by the broadcast-information reception unit 1a contains the piece indicating that the wireless base station 2 is a femtocell, the wireless-link establishment unit 1b establishes a wireless link between the wireless terminal 1 and the wireless controller 3 by transmitting to the wireless controller 3 a request to set up a wireless link.

The link-request reception unit 3a in the wireless controller 3 receives from the wireless terminal 1 the request to set up a wireless link, and the wireless-link establishment unit 3b establishes a wireless link to the wireless terminal 1 when the link-request reception unit 3a receives the request to set up a wireless link.

The wireless terminal 1, the wireless base station 2, and the wireless controller 3 illustrated in FIG. 1 operate as follows.

When the wireless terminal 1 is within the area covered by the wireless base station 2 as a femtocell, the wireless terminal 1 receives the information broadcasted from the wireless base station 2, which contains the aforementioned piece indicating that the wireless base station 2 is a femtocell.

When the broadcast-information reception unit 1a in the wireless terminal 1 receives the information broadcasted from the wireless base station 2, the wireless-link establishment unit 1b in the wireless terminal 1 establishes a wireless link between the wireless terminal 1 and the wireless controller 3 through the wireless base station 2.

When the wireless terminal 1 receives a user's input of a request to start wireless communication, the wireless link between the wireless terminal 1 and the wireless controller 3 is already established. Therefore, the wireless terminal 1 can immediately start processing for setting up a wireless access line beyond the wireless controller 3 without performing operations for establishing the wireless link between the wireless terminal 1 and the wireless controller 3. That is, the wireless terminal 1 can reduce the time taken to start the wireless communication.

As explained above, according to the present invention, the wireless base station 2 broadcasts the piece of information indicating that the wireless base station 2 is a femtocell, and the wireless terminal 1 can detect that the wireless terminal 1 is within the area covered by the wireless base station 2 realizing the femtocell. When the wireless terminal 1 can detect that the wireless terminal 1 is within the area covered by the wireless base station 2 realizing the femtocell, the wireless terminal 1 establishes a wireless link between the wireless terminal 1 and the wireless controller 3 in advance of the user's input of the request to start communication. Thereafter, when the wireless terminal 1 receives the user's input of the request to start communication, the wireless terminal 1 can start operations for establishing a wireless access line beyond the wireless controller 3 without performing the operations for setting up a wireless link, so that the wireless terminal 1 can reduce the time taken to start the wireless communication after the user's requests for the start of the communication.

Specifically, the wireless base station 2 realizing the femtocell broadcasts information indicating that the wireless base station 2 is a femtocell. Then, when the wireless terminal 1 is in a stand-by state, the wireless terminal 1 receives the broadcasted information, and transmits by a wireless signal to the wireless base station 2 a message for requesting allocation of one or more wireless resources, although the wireless terminal 1 receives neither a call nor the user's input of a request for initiating a call (i.e., before the wireless terminal 1 receives a call or the user's input of a request for initiating a call). The wireless base station 2 or the wireless controller 3 (when the wireless controller 3 receives the above message from the wireless base station 2) captures one or more wireless resources for use in wireless communication between the wireless terminal 1 and the wireless base station 2 realizing the femtocell. In the case where the wireless base station 2 provides a wireless-communication service to only predetermined wireless terminals (e.g., wireless terminals registered in a memory in the wireless base station 2 realizing the femtocell), even when one or more wireless resources are secured in advance of reception, by the wireless terminal 1, of a call or the user's input of a request for initiating a call, the early (advance) securement of the one or more wireless resources for a wireless terminal registered in the memory in the wireless base station 2 does not produce seriously harmful effects since the one or more secured wireless resources are not supposed to be provided to the other wireless terminals (including wireless terminals which are not registered as objects of the wireless-communication service in the wireless base station 2).

In summary, according to the present invention, the wireless base station realizing a femtocell transmits the broadcasted information indicating that the wireless base station is a femtocell. When the wireless terminal receives the broadcasted information, the wireless terminal transmits a signal requesting the wireless base station to secure one or more wireless resources in advance of reception, by the wireless terminal, of a call or the user's input of a request for initiating a call. Then, the wireless base station secures the one or more wireless resources in accordance with the request. Thereafter, when an operation for initiating a call is performed on the wireless terminal, the one or more wireless resources which are already secured are used, so that it is possible to perform operations for establishing a wireless access line beyond the wireless controller without performing a sequence of operations for securing one or more wireless resources, and therefore quickly provide the wireless-communication service.

Further, the wireless base station 2, instead of the wireless controller 3, may comprise the functions of the link-request reception unit 3a and the wireless-link establishment unit 3b.

2. First Embodiment

The first embodiment of the present invention is explained in detail below.

Figure 2:
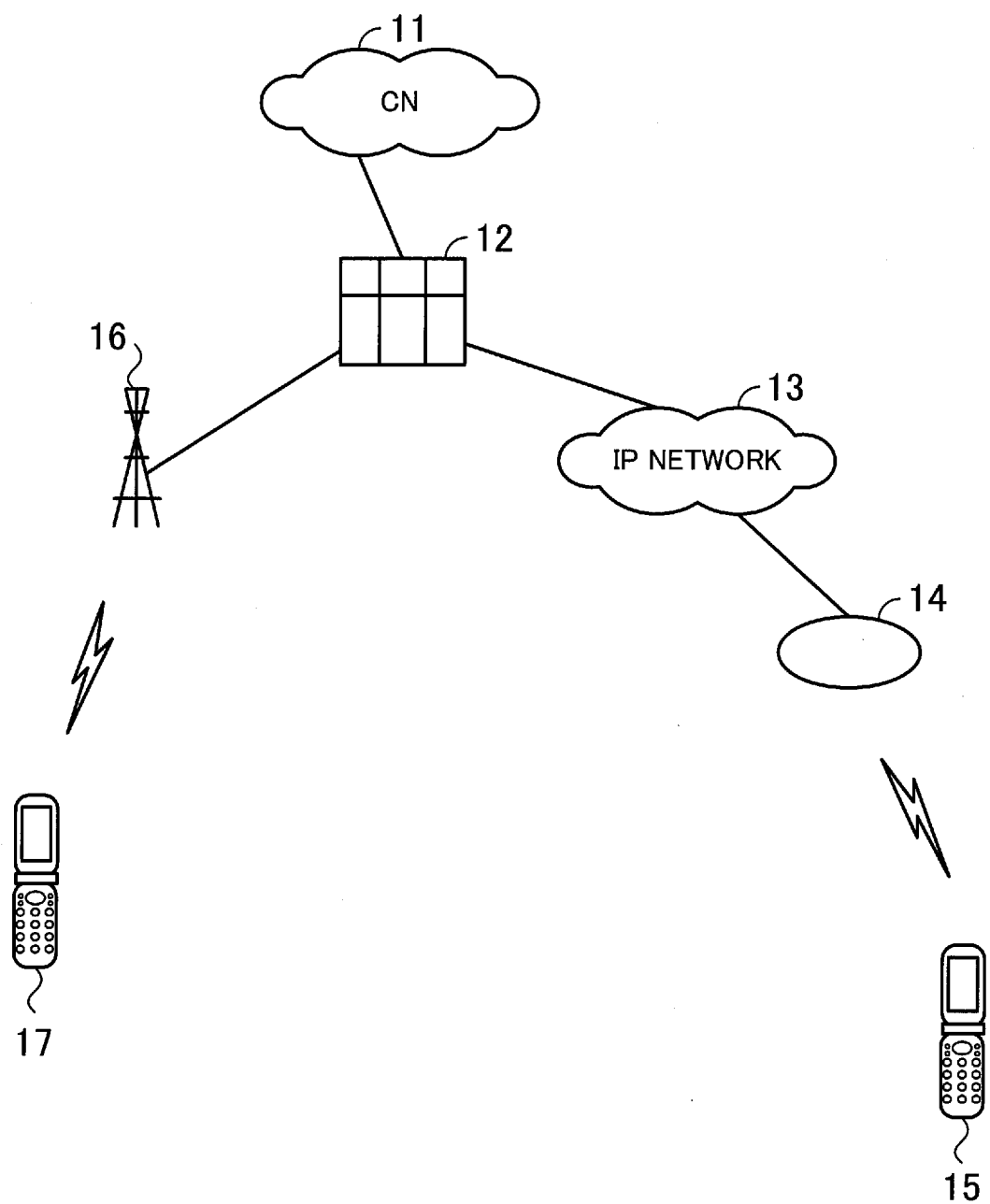
FIG. 2 is a diagram illustrating an example of a femtocell-based communication system according to a first embodiment of the present invention.

FIG. 2 is a diagram illustrating an example of a femtocell-based communication system according to the first embodiment. In FIG. 2, reference numeral 11 denotes a core network (CN), 12 denotes a radio network controller (RNC), 13 denotes an IP (Internet Protocol) network, 14 denotes a femtocell, 15 and 17 each denote a UE (a piece of user equipment), and 16 denotes a Node B. The CN 11, the RNC 12, the Node B 16, and the UE 17 constitute a legacy wireless network system, and the CN 11, the RNC 12, the IP network 13, the femtocell 14, and the UE 15 constitute the femtocell-based wireless network system. The UEs 15 and 17 are, for example, mobile telephones.

Although wireless communication in accordance with W-CDMA (Wideband Code Division Multiple Access), LTE (Long Term Evolution), or the like may be performed in the wireless network system of FIG. 2, it is assumed that the wireless network system of FIG. 2 operates in accordance with W-CDMA, and the femtocell 14 operates in a similar manner to the Node B 16 in accordance with W-CDMA. However, in the case where the wireless network system of FIG. 2 operates in accordance with LTE, the functions of the RNC 12 and the Node B 16 can be realized by a single device (eNode B), and the functions of the RNC 12 and the femtocell 14 can also be realized by a single device (eNode B).

Although not shown, the femtocell 14 is realized by a Node B which performs wireless communication with the UE 15, and the Node B realizing the femtocell 14 is placed in a house or an office, and covers wireless communication within the range of tens of meters.

The Node B realizing the femtocell 14 periodically broadcasts information to one or more wireless terminals within the above range, and the broadcasted information contains a piece indicating that the information is broadcasted from the femtocell 14.

When the UE 15 enters the area covered by the femtocell 14, the UE 15 receives the information broadcasted from the femtocell 14, so that the UE 15 can recognize that the UE 15 is within the area covered by the femtocell 14. When the UE 15 recognizes that the UE 15 is within the area covered by the femtocell 14, the UE 15 establishes a wireless link between the UE 15 and the RNC 12 through the Node B realizing the femtocell 14 in advance of reception of a call or the user's input for requesting initiation of a call.

When the user of the UE 15 initiates communication by using the UE 15, for example, the user presses down a call button. Then, the UE 15 establishes a wireless access line between the UE 15 and the CN 11 in response to the press down of the call button. Since the wireless link is established by the UE 15 in advance of the press down of the call button, the UE 15 can start the call-connection processing from the establishment of the wireless access line in order to perform wireless communication with an opposite party.

On the other hand, since the Node B 16 is not a Node B realizing a femtocell, information broadcasted from the Node B 16 does not contain a piece indicating the Node B 16 is a femtocell. Therefore, even when the UE 17 is within the area covered by the Node B 16 (i.e., within a cell of the Node B 16), the UE 17 does not establish a wireless link between the UE 17 and the RNC 12 through the Node B 16 in advance of reception of a call or a user's input for requesting initiation of a call. After the user presses down the call button on the UE 17, the UE 17 establishes a wireless link between the UE 17 and the RNC 12 and then a wireless access line between the UE 17 and the CN 11 in order to perform communication with an opposite party.

As explained above, according to the present invention, the Node B realizing the femtocell 14 broadcasts information. When the UE 15 receives the information broadcasted from the femtocell 14, the UE 15 recognizes that the UE 15 is within the area covered by the femtocell 14, and establishes a wireless link between the UE 15 and the RNC 12 in advance of reception of a call or the user's input for requesting initiation of a call. Thereafter, when the UE 15 starts communication, the UE 15 is not required to perform the operations for establishing the wireless link, so that the time taken to start the communication after the user's request for the start of the communication can be reduced.

Figure 3:
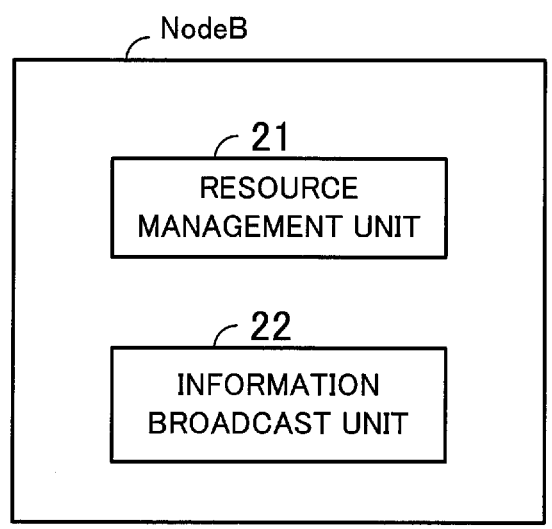
FIG. 3 is a block diagram illustrating the functions of a Node B realizing a femtocell in the femtocell-based communication system according to the first embodiment.

FIG. 3 is a block diagram illustrating the functions of the Node B realizing the femtocell 14. As illustrated in FIG. 3, the Node B realizing the femtocell 14 comprises a resource management unit 21 and an information broadcast unit 22.

The resource management unit 21 manages one or more wireless resources allocated to the UE 15. For example, the resource management unit 21 allocates one or more wireless physical resources such as a radio frequency, a code, and the like to the UE 15, which requests the Node B to establish the wireless link. Then, the resource management unit 21 manages the one or more allocated wireless physical resources.

The information broadcast unit 22 periodically broadcasts information to one or more wireless terminals located within the area covered by the femtocell 14, and the broadcasted information contains a piece indicating that the information is broadcasted from the femtocell 14. Therefore, when the UE 15 receives the information broadcasted from the femtocell 14, the UE 15 can recognize that the UE 15 is within the area covered by the femtocell 14.

Figure 4:
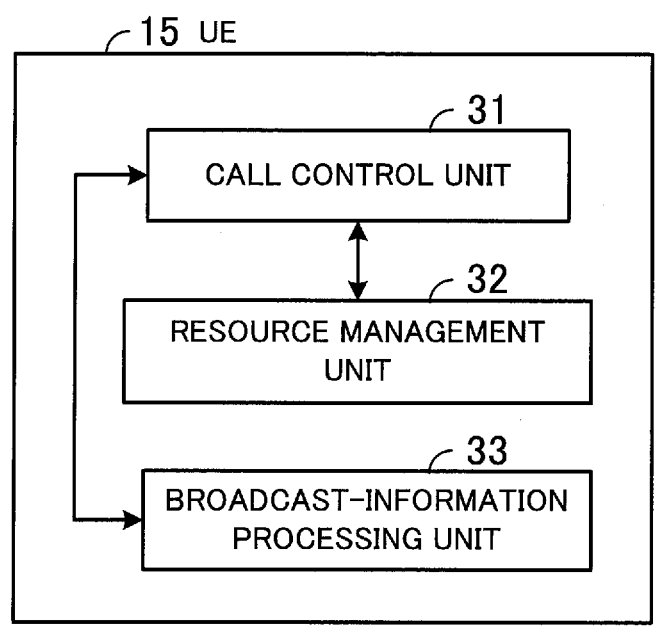
FIG. 4 is a block diagram illustrating the functions of a UE (a piece of user equipment) arranged for the femtocell-based communication system according to the first embodiment.

FIG. 4 is a block diagram illustrating the functions of the UE 15. As illustrated in FIG. 4, the UE 15 comprises a call control unit 31, a resource management unit 32, and a broadcast-information processing unit 33.

The broadcast-information processing unit 33 determines whether or not the UE 15 is within the area covered by the femtocell 14, on the basis of the broadcasted information received from the Node B realizing the femtocell 14. Since the broadcasted information received from the Node B realizing the femtocell 14 contains a piece of information on the femtocell. The UE 15 can recognize that the UE 15 is within the area covered by the femtocell 14 when the UE 15 receives the piece of information on the femtocell.

The call control unit 31 performs call-connection processing. Specifically, when the broadcast-information processing unit 33 determines that the UE 15 is within the area covered by the femtocell 14, the call control unit 31 transmits a request to establish a wireless link between the UE 15 and the RNC 12 through the Node B realizing the femtocell 14. In addition, when the user of the UE 15 inputs a request to start communication while the UE 15 is within the area covered by the femtocell 14, the call control unit 31 performs operations for establishing a wireless access line between the UE 15 and the CN 11 without performing the operations for establishing a wireless link. Further, when the user of the UE 15 inputs a request to start communication while the UE 15 is outside the area covered by the femtocell 14, the call control unit 31 performs the conventional operations for call connection. That is, when the user of the UE 15 inputs a request to start communication while the UE 15 is outside the area covered by the femtocell 14, the call control unit 31 performs operations for establishing a wireless link and then operations for establishing a wireless access line.

The resource management unit 32 manages wireless resources for use in wireless communication. The Node B realizing the femtocell 14 or the Node B 16 informs the UE 15 of the one or more wireless resources which are to be used in the wireless communication requested by the UE 15.

Figure 5:
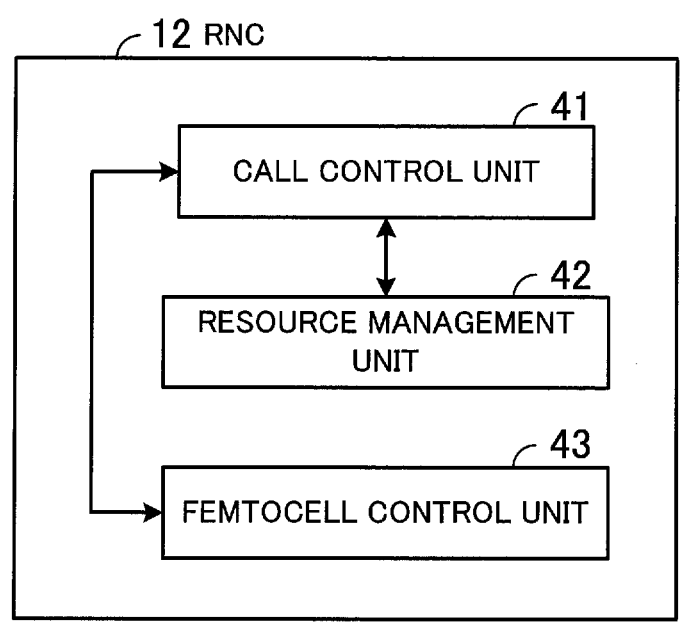
FIG. 5 is a block diagram illustrating the functions of an RNC arranged for the femtocell-based communication system according to the first embodiment.

FIG. 5 is a block diagram illustrating the functions of the RNC 12. As illustrated in FIG. 5, the UE 15 comprises a call control unit 41, a resource management unit 42, and a femtocell control unit 43.

The call control unit 41 performs call-connection processing. Specifically, when the RNC 12 receives a request to establish a wireless link from the UE 15 existing within the area covered by the femtocell 14, the call control unit 41 establishes and maintains a wireless link between the RNC 12 and the UE 15 before the UE 15 receives a call or the user's input for requesting initiation of a call. In addition, when the RNC 12 receives a call-connection request from the Node B 16 having the conventional functions, the call control unit 41 establishes a wireless link between the RNC 12 and the UE 17 and a wireless access line between the UE 17 and the CN 11.

The resource management unit 42 receives from the Node B realizing the femtocell 14 and the Node B 16 information on wireless resources which are allocated to the UEs 15 and 17, and manages wireless logical resources which are used in wireless communication with the UEs 15 and 17.

The femtocell control unit 43 manages the femtocell 14. For example, the femtocell control unit 43 manages the attribute of the femtocell 14 (which indicates the existence of the femtocell 14), and information indicating the number of wireless channels, the number of initial power values, and the like.

Figure 6:
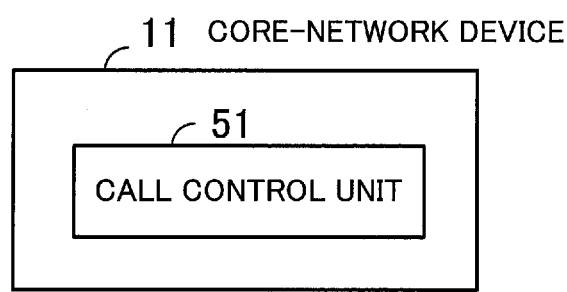
FIG. 6 is a block diagram illustrating a function of a core-network device (e.g., an exchange) constituting a CN in the femtocell-based communication system according to the first embodiment.

FIG. 6 is a block diagram illustrating the function of a core-network device (e.g., an exchange) constituting the CN 11. As illustrated in FIG. 6, the core-network device constituting the CN 11 comprises a call control unit 51. The call control unit 51 performs call-connection processing for the UEs 15 and 17. In addition, the call control unit 51 registers the locations of the UEs 15 and 17, and performs processing for authentication and concealed communication for the UEs 15 and 17. Further, when the core-network device constituting the CN 11 receives a request to set up a wireless access line, the call control unit 51 sets up a wireless access line.

Figure 7:
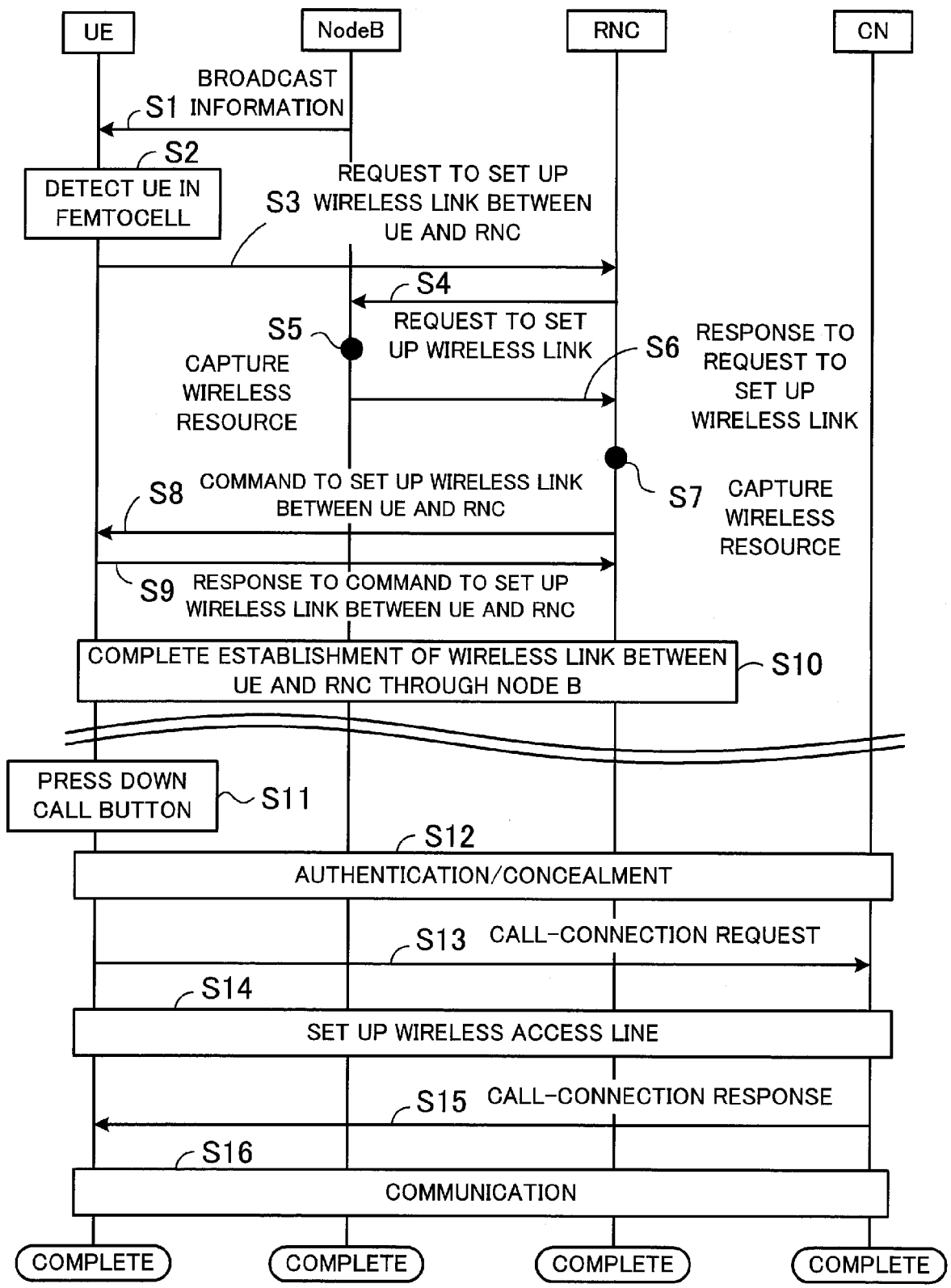
FIG. 7 is a sequence diagram illustrating a sequence of operations for establishing a wireless link and a wireless access line according to the first embodiment.

FIG. 7 is a sequence diagram illustrating a sequence of operations for establishing a wireless link and a wireless access line according to the first embodiment of the present invention.

In step S1, the Node B realizing the femtocell 14 periodically broadcasts information.

In step S2, when the UE 15 enters an area in which the information is broadcasted from the Node B realizing the femtocell 14, the UE 15 receives the broadcasted information, and recognizes that the UE 15 is within the area covered by the femtocell 14.

In step S3, the UE 15 transmits to the RNC 12 through the Node B realizing the femtocell 14 a request to set up a wireless link between the UE 15 and the RNC 12. The wireless link is called a radio link in 3G (the 3rd generation mobile telecommunications standards and technology). When the RNC transmits to the Node B a request to set up a radio link, the Node B secures one or more physical resources such as a radio frequency. Thus, the UE and the RNC are connected through the radio link.

In step S4, when the RNC 12 receives from the UE 15 the request to set up a wireless link, the RNC 12 transmits to the Node B realizing the femtocell 14 a request to set up a wireless link.

In step S5, when the Node B realizing the femtocell 14 receives the request to set up a wireless link from the RNC 12, the Node B realizing the femtocell 14 captures one or more wireless resources to be allocated to the UE 15.

In step S6, the Node B realizing the femtocell 14 returns to the RNC 12 a response to the request to set up a wireless link. At this time, the Node B realizing the femtocell 14 transmits to the RNC 12 information on the one or more wireless resources allocated to the UE 15.

In step S7, the RNC 12 receives from the Node B realizing the femtocell 14 the response to the request to set up a wireless link, and captures the one or more wireless resources allocated to the UE 15, on the basis of the information received from the RNC 12.

In step S8, the RNC 12 transmits a command to set up a wireless link, to the UE 15 through the Node B realizing the femtocell 14. At this time, the RNC 12 informs the UE 15 of the one or more wireless resources captured for the UE 15.

In step S9, the UE 15 manages the one or more wireless resources of which the UE 15 is informed by the RNC 12, in accordance with the command transmitted from the RNC 12, and uses the one or more wireless resources for wireless communication. The UE 15 returns to the RNC 12 through the Node B realizing the femtocell 14 a response to the command to set up the wireless link.

In step S10, the UE 15, the RNC 12, and the Node B realizing the femtocell 14 complete the establishment of the wireless link between the UE 15 and the RNC 12. Thus, the UE 15 maintains the wireless link between the UE 15 and the RNC 12 through the Node B realizing the femtocell 14 while the UE 15 is within the area covered by the femtocell 14.

In step S11, the user presses down the call button, so that the UE 15 starts the wireless communication.

In step S12, the UE 15, the Node B realizing the femtocell 14, the RNC 12, and the core-network device constituting the CN 11 perform processing for authentication and concealed communication. For example, the core-network device constituting the CN 11 performs the authentication by confirming whether or not the UE 15 (which is requesting establishment of a wireless access line between the UE 15 and the CN 11) is a valid UE. In addition, the UE 15 and the RNC 12 perform, in accordance with a command from the core-network device constituting the CN 11, processing for realizing concealed communication between the UE 15 and the RNC 12.

In step S13, the UE 15 transmits a call-connection request through the Node B realizing the femtocell 14 and the RNC 12 to the core-network device constituting the CN 11.

In step S14, the UE 15, the Node B realizing the femtocell 14, the RNC 12, and the core-network device constituting the CN 11 perform processing for establishing a wireless access line. The wireless access line is an access line for transmitting user data between the UE and the CN, and corresponds to the radio access bearer (RAB) in 3G.

In step S15, the core-network device constituting the CN 11 completes the processing for establishing the wireless access line, and returns a call-connection response to the UE 15.

In step S16, the UE 15 exchanges user data (e.g., communication data) with an opposite party through the wireless access line.

As explained above, the Node B realizing the femtocell 14 broadcasts the information indicating that the Node B realizes a femtocell. When the UE 15 receives the broadcasted information, the UE 15 recognizes that the UE 15 is within the area covered by the femtocell 14. Therefore, the UE 15 establishes a wireless link between the UE 15 and the RNC 12. Thereafter, when the UE 15 starts communication, the UE 15 is not required to perform the operations for establishing the wireless link, so that it is possible to reduce the time taken to start the communication after the user of the UE 15 requests the start of the communication.

Further, in the case where the opposite party to the UE 15 (i.e., the party which received the call from the UE 15) is also within the area covered by the femtocell 14, a wireless link between the opposite party and the femtocell 14 is already established when the UE 15 initiates the call to the opposite party. Therefore, when the UE 15 initiates a call to the opposite party, it is possible to establish a wireless access line between the UE 15 and the CN without performing operations for establishing a wireless link between the UE 15 and the RNC 12, so that the time taken to start the communication after the user's request for the start of the communication can be reduced.

3. Second Embodiment

The second embodiment of the present invention is explained in detail below.

In the femtocell-based wireless network system according to the first embodiment, the Node B realizing a femtocell broadcasts information. When the UE receives the broadcasted information, the UE recognizes that the UE is within the area covered by the femtocell. On the other hand, in the femtocell-based wireless network system according to the second embodiment, a core-network device constituting the CN recognizes the existence of a UE within the area covered by the femtocell on the basis of the location of the UE registered in the core-network device.

Figure 8:
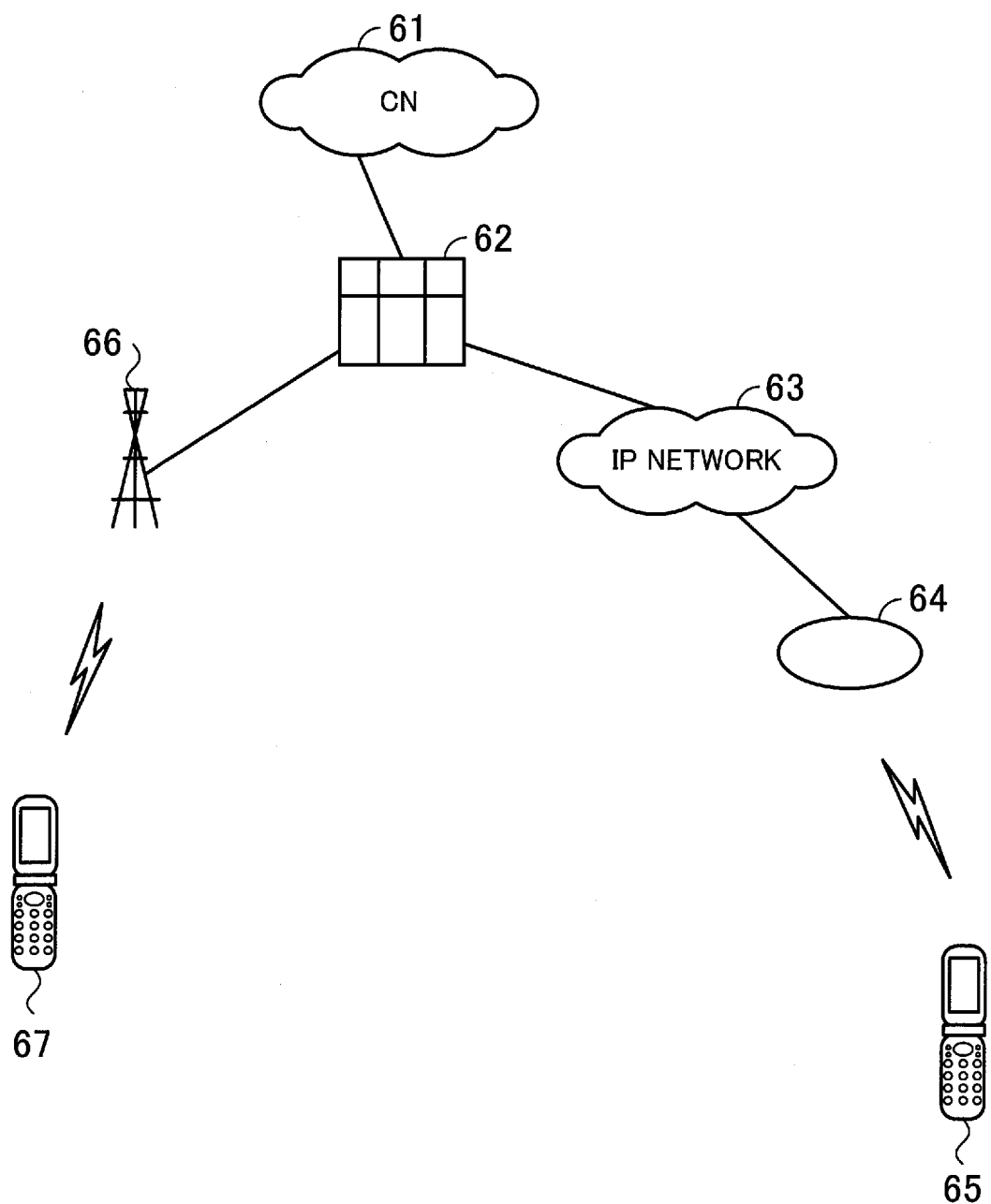
FIG. 8 is a diagram illustrating an example of a femtocell-based communication system according to a second embodiment of the present invention.

FIG. 8 is a diagram illustrating an example of the femtocell-based communication system according to the second embodiment of the present invention. In FIG. 8, reference numeral 61 denotes a core network (CN), 62 denotes a radio network controller (RNC), 63 denotes an IP (Internet Protocol) network, 64 denotes a femtocell, 65 and 67 each denote a UE (a piece of user equipment), and 66 denotes a Node B. The CN 61, the RNC 62, the Node B 66, and the UE 67 constitute a legacy wireless network system, and the CN 61, the RNC 62, the IP network 63, the femtocell 64, and the UE 65 constitute the femtocell-based wireless network system. The UEs 65 and 67 are, for example, mobile telephones.

In the wireless network system of FIG. 8, wireless communication in accordance with W-CDMA (Wideband Code Division Multiple Access), LTE (Long Term Evolution), or the like may be performed as in the wireless network system of FIG. 2.

In the mobile communication systems, information on the locations of the UEs 65 and 67 (indicating which femtocell covers the current location of each of the UEs 65 and 67) are registered in a core-network device constituting the CN 61. Therefore, the core-network device constituting the CN 61 can determine whether or not each of the UEs 65 and 67 is within the area covered by the femtocell 64.

When the core-network device constituting the CN 61 detects, on the basis of the registered location of the UE 65, that the UE 65 is within the area covered by the femtocell 64, the core-network device constituting the CN 61 requests the RNC 62 to establish a wireless link between the RNC 62 and the UE 65 in advance of reception or initiation of a call by the UE 65. Thus, the RNC 62 and the UE 65 can establish the wireless link between the UE 65 and the RNC 62 in advance of reception or initiation of a call by the UE 65.

On the other hand, the UE 67 is within the area covered by the Node B 66. Since the Node B 66 is not a femtocell, the core-network device constituting the CN 61 does not request the RNC 62 to establish a wireless link between the Node B 66 and the UE 67 in advance of reception or initiation of a call by the UE 67.

As explained above, the core-network device constituting the CN 61 detects, on the basis of the registered location of the UE 65, that the UE 65 is within the area covered by the femtocell 64. Then, the core-network device constituting the CN 61 requests the RNC 62 to establish a wireless link between the RNC 62 and the UE 65 in advance of reception or initiation of a call by the UE 65. Thereafter, when the UE 65 starts communication, the UE 65 is not required to perform the operations for setting up the wireless link, so that it is possible to reduce the time taken to start the communication after the communication is requested.

The functions of a Node B realizing the femtocell 64, the UE 65, the RNC 62, and the CN 61 are explained below.

The Node B realizing the femtocell 64 comprises a resource management unit and an information broadcast unit as the Node B realizing the femtocell 14 illustrated in FIG. 3. The information broadcast unit in the Node B realizing the femtocell 64 periodically broadcasts information to one or more wireless terminals located within the area covered by the femtocell 64. However, the broadcasted information may or may not contain a piece indicating that the information is broadcasted from the femtocell 64, since the core-network device constituting the CN 61 can determine, on the basis of the location of the UE 65 registered in the CN 61, whether or not the UE 65 is within the area covered by the femtocell 64.

The UE 65 comprises a call control unit and a resource management unit as the UE 15 illustrated in FIG. 4. However, since the UE 65 does not determine whether or not the UE 65 is within the area covered by the femtocell 64 on the basis of the information broadcasted from the Node B realizing the femtocell 64, the UE 65 does not comprise the function of the broadcast-information processing unit 33 illustrated in FIG. 4. The call control unit in the UE 65 establishes a wireless link between the UE 65 and the RNC 62 in response to a request to establish a wireless link, where the request is transmitted from the core-network device constituting the CN 61.

The RNC 62 comprises a call control unit, a resource management unit, and femtocell control unit as the RNC 12 illustrated in FIG. 5.

The core-network device constituting the CN 61 comprises a call control unit as the CN 11 illustrated in FIG. 6. However, the call control unit in the core-network device constituting the CN 61 determines whether or not each of the UEs 65 and 67 is within the area covered by the femtocell 64 when the locations of the UEs 65 and 67 are registered. In addition, when the call control unit determines that the UE 65 is within the area covered by the femtocell 64, the call control unit requests the RNC 62 to establish a wireless link between the UE 65 and the RNC 62 in advance of reception or initiation of a call by the UE 65.

Figure 9:
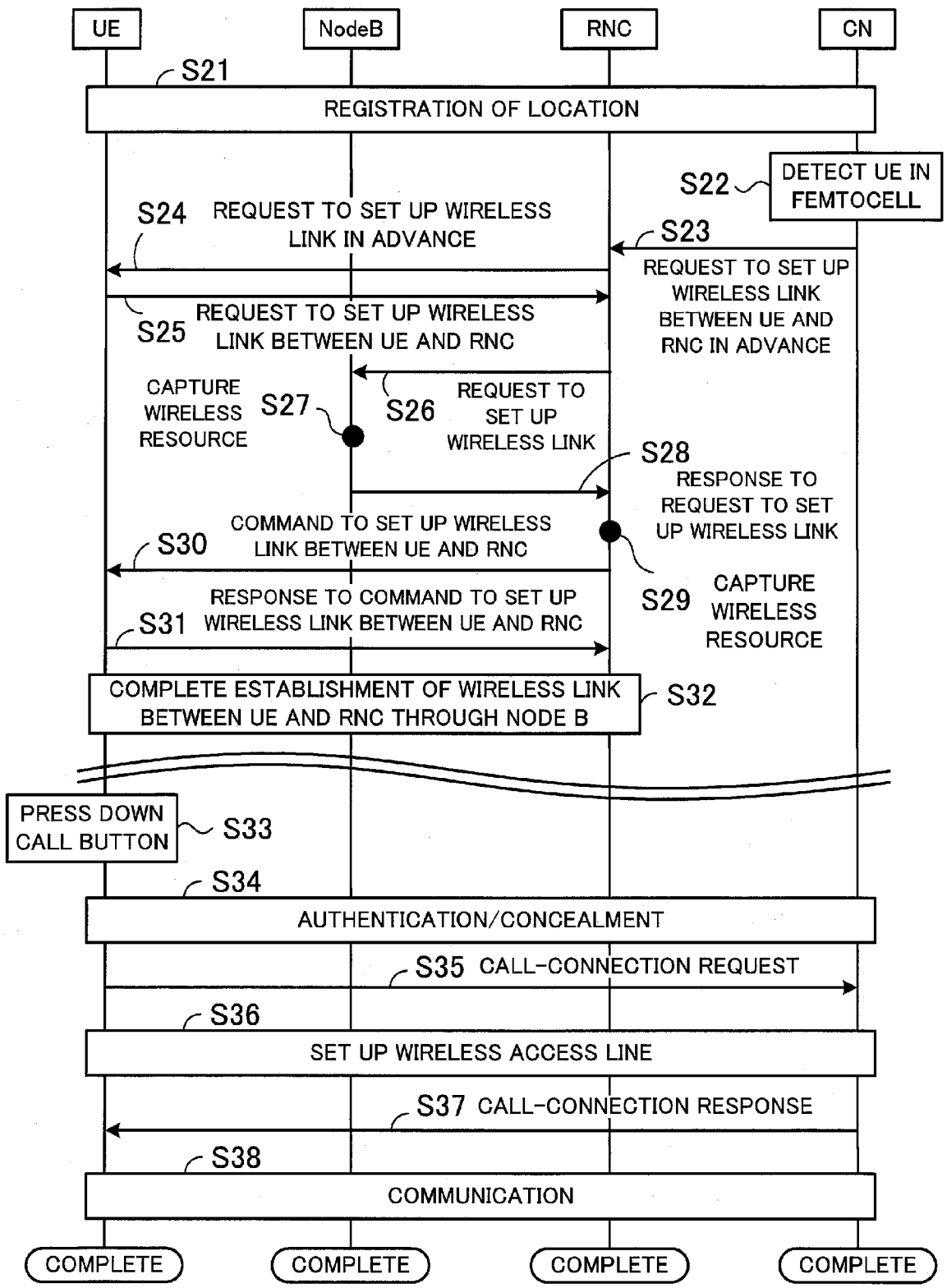
FIG. 9 is a sequence diagram illustrating a sequence of operations for establishing a wireless link and a wireless access line according to the second embodiment.

FIG. 9 is a sequence diagram illustrating a sequence of operations for establishing a wireless link and a wireless access line according to the second embodiment of the present invention.

In step S21, the core-network device constituting the CN 61 registers the location of the UE 65. For example, the UE 65 receives the information broadcasted from the Node B realizing the femtocell 64, and transmits to the core-network device constituting the CN 61 cell information contained in the broadcasted information. The core-network device constituting the CN 61 determines which cell the UE 65 belongs to, on the basis of the cell information received from the UE 65, and registers the location of the UE 65.

In step S22, the core-network device constituting the CN 61 determines whether or not the UE 65 belongs to the femtocell 64, on the basis of the registered location of the UE 65. The core-network device constituting the CN 61 recognizes femtocells, and stores information on the femtocells in advance.

In step S23, the core-network device constituting the CN 61 transmits to the RNC 62 a command to establish a wireless link between the UE 65 and the RNC 62 in advance of reception or initiation of a call by the UE 65.

In step S24, the RNC 62 receives from the core-network device constituting the CN 61 the command to establish in advance a wireless link between the UE 65 and the RNC 62, and transmits to the UE 65 through the Node B realizing the femtocell 64 the command to establish in advance a wireless link between the UE 65 and the RNC 62.

In step S25, when the UE 65 receives from the RNC 62 the command to establish in advance a wireless link between the UE 65 and the RNC 62, the UE 65 transmits to the RNC 62 a request to set up in advance a wireless link between the UE 65 and the RNC 62.

Thereafter, operations similar to the operations in steps S4 to S16 in FIG. 7 are performed in steps S26 to S38. Therefore, the operations in steps S26 to S38 are not explained.

As explained above, according to the second embodiment, the core-network device constituting the CN 61 determines, on the basis of the registered location of the UE 65, whether or not each of the UEs 65 and 67 is within the area covered by the femtocell 64. When the core-network device constituting the CN 61 determines that the UE 65 is within the area covered by the femtocell 64, the core-network device constituting the CN 61 transmits to the RNC 62 a request to establish in advance a wireless link between the UE 65 and the RNC 62. Therefore, when the UE 65 initiates a call to the opposite party, it is possible to establish a communication path between the UE 65 and the opposite party without performing operations for establishing a wireless link between the UE 65 and the RNC 62, so that the time taken to start the communication after the user's request for the start of the communication can be reduced.

4. Third Embodiment

The third embodiment of the present invention is explained in detail below.

The femtocell-based communication system according to the third embodiment is different from the first embodiment in that a Node B realizing a femtocell in the third embodiment also has the functions of an RNC and a core-network device (i.e., collapsed type), although the Node B realizing the femtocell, the RNC, and the core-network device in the first embodiment are realized by separate devices.

Figure 10:
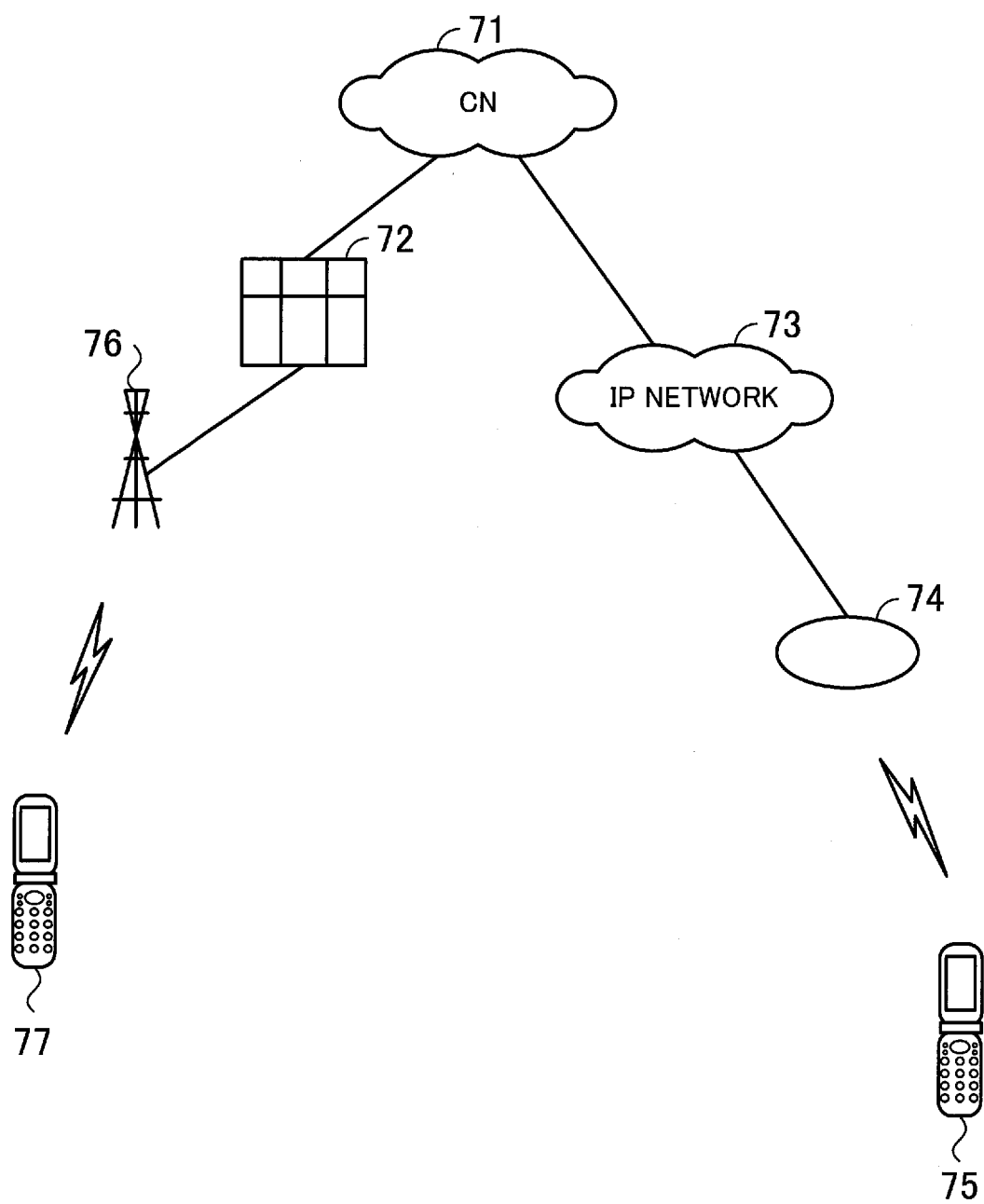
FIG. 10 is a diagram illustrating an example of a femtocell-based communication system according to a third embodiment.

FIG. 10 is a diagram illustrating an example of a femtocell-based communication system according to the third embodiment of the present invention. In FIG. 10, reference numeral 71 denotes a core network (CN), 72 denotes a radio network controller (RNC), 73 denotes an IP (Internet Protocol) network, 74 denotes a femtocell, 75 and 77 each denote a UE (a piece of user equipment), and 76 denotes a Node B. The CN 71, the RNC 72, the Node B 76, and the UE 77 constitute a legacy wireless network system, and the CN 71, the IP network 73, the femtocell 74, and the UE 75 constitute the femtocell-based wireless network system. The UEs 75 and 77 are, for example, mobile telephones.

In the wireless network system of FIG. 10, wireless communication in accordance with W-CDMA (Wideband Code Division Multiple Access), LTE (Long Term Evolution), or the like may be performed as in the wireless network system of FIG. 2.

As in the first embodiment, the Node B realizing the femtocell 74 periodically broadcasts information, and the broadcasted information contains a piece which indicates that the information is transmitted from a femtocell.

When the UE 75 enters the area covered by the femtocell 74, the UE 75 receives the information broadcasted from the femtocell 74. As in the first embodiment, when the UE 75 receives the information broadcasted from the femtocell 74, the UE 75 recognizes that the UE 75 is within the area covered by the femtocell 74, and establishes a wireless link between the UE 75 and the femtocell 74.

The wireless network of FIG. 10 has a collapsed-type structure in which the Node B realizing the femtocell 74 has the functions of an RNC and a core-network device. Therefore, the Node B realizing the femtocell 74 can allocate one or more wireless resources to the UE 75 independently of the RNC 72. Thus, even when the UE 75 establishes in advance the wireless link between the UE 75 and the femtocell 74, it is possible to prevent the RNC 72 from securing useless wireless resources.

For example, in the wireless network of FIG. 2, the RNC 12 is required to manage the allocation of the wireless resources to the UEs 15 and 17. Therefore, when the UE 15 is within the area covered by the femtocell 14, and a wireless link between the UE 15 and the RNC 12 is established in advance, the one or more wireless resources for the wireless link are uselessly secured until the wireless link is actually used in communication. On the other hand, in the wireless network of FIG. 10, when the UE 75 is within the area covered by the femtocell 74, the Node B realizing the femtocell 74 allocates one or more wireless resources to the UE 75 independently of the RNC 72. Therefore, the RNC 72 can effectively allocate one or more wireless resources to the UE 77 when the UE 77 belongs to a cell covered by the Node B 76.

When the wireless link between the UE 75 and the Node B realizing the femtocell 74 is established, the Node B realizing the femtocell 74 also establishes a wireless access line between the UE 75 and the femtocell 74. This is because the Node B realizing the femtocell 74 has the functions of a core-network device. Therefore, when the user of the UE 75 inputs a request to initiate a call, the UE 75 can start exchange of user data by establishing a communication path to an opposite party without performing operations of establishing a wireless link and a wireless access line between the UE 75 and the femtocell 74.

As explained above, since the Node B realizing the femtocell 74 and having the collapsed-type structure has the functions of an RNC and a core-network device, when the UE 75 is within the area covered by the femtocell 74, it is possible to establish both of the wireless link and the wireless access line between the UE 75 and the femtocell 74 in advance of reception or initiation of a call by the UE 75. That is, when the UE 75 initiates a call to the opposite party, the UE 75 can start communication with the opposite party by only establishing a communication path to the opposite party without performing operations of establishing a wireless link and a wireless access line between the UE 75 and the femtocell 74. Therefore, it is possible to reduce the time taken to start the communication after the user of the UE 75 requests the start of the communication.

Figure 11:
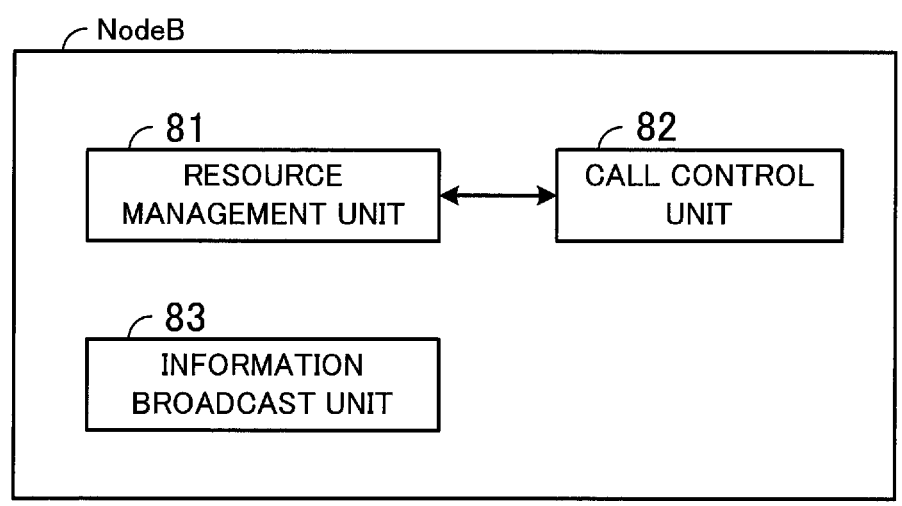
FIG. 11 is a block diagram illustrating functions of a Node B realizing a femtocell in the femtocell-based communication system according to the third embodiment.

FIG. 11 is a block diagram illustrating the functions of the Node B realizing the femtocell 74. As illustrated in FIG. 11, the Node B realizing the femtocell 74 comprises a resource management unit 81, a call control unit 82, and an information broadcast unit 83.

The resource management unit 81 manages one or more wireless resources allocated to the UE 75 (e.g., one or more wireless physical resources such as a radio frequency, a code, and the like). For example, the resource management unit 81 allocates one or more wireless physical resources to the UE 75 in accordance with a command from the call control unit 82, and manages the one or more allocated wireless physical resources.

The call control unit 82 performs call-connection processing. Specifically, the call control unit 82 has the functions of an RNC and a core-network device, and establishes in advance a wireless link and a wireless access line between the UE 75 and the Node B realizing the femtocell 74 when the UE 75 is within the area covered by the femtocell 74.

In addition, when the user of the UE 75 inputs a request to start communication while the UE 75 is within the area covered by the femtocell 74, the call control unit 82 performs operations for establishing a communication path to the opposite party without performing operations of setting up a wireless link and a wireless access line between the UE 75 and the Node B realizing the femtocell 74. Further, the call control unit 82 registers the location of the UE 75 when the UE 75 is within the area covered by the femtocell 74, and performs processing for authentication of the UE 75 and concealment when the wireless access line is established.

The information broadcast unit 83 periodically broadcasts information to one or more wireless terminals within the area covered by the femtocell 74, and the broadcasted information contains a piece indicating that the information is broadcasted from the femtocell 74. Therefore, when the UE 75 receives the information broadcasted from the femtocell 74, the UE 75 can recognize that the UE 75 is within the area covered by the femtocell 74.

The UE 75 has functions similar to the functions of the UE 15 illustrated in FIG. 4 except that the UE 75 establishes a wireless link and a wireless access line between the UE 75 and the Node B realizing the femtocell 74.

Figure 12:
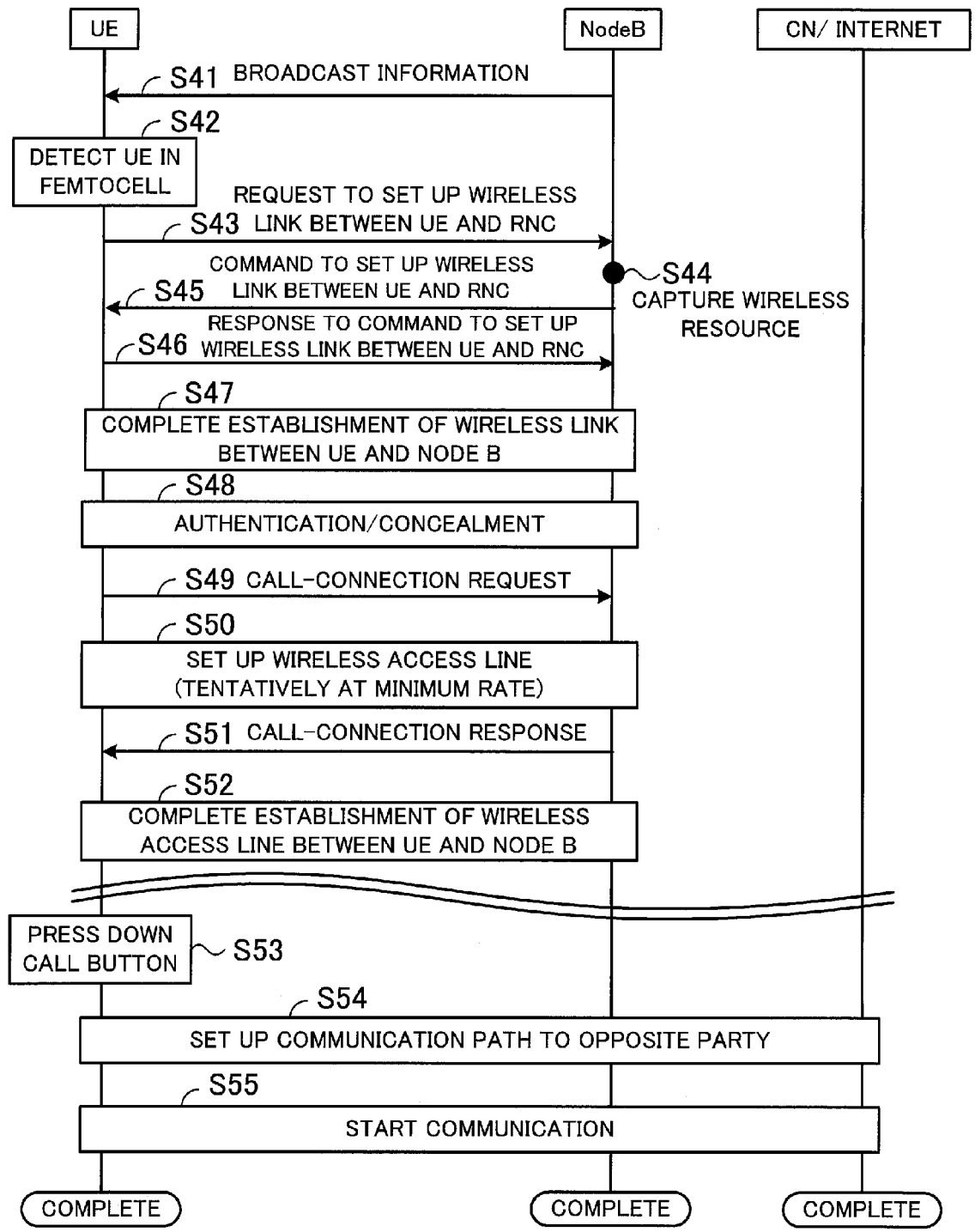
FIG. 12 is a sequence diagram illustrating a sequence of operations for establishing a wireless link and a wireless access line according to the third embodiment.

FIG. 12 is a sequence diagram illustrating a sequence of operations for establishing a wireless link and a wireless access line according to the third embodiment of the present invention.

In step S41, the Node B realizing the femtocell 74 periodically broadcasts information.

In step S42, when the UE 75 enters the area in which the information is broadcasted from the Node B realizing the femtocell 74, the UE 75 receives the broadcasted information, and recognizes that the UE 75 is within the area covered by the femtocell 74.

In step S43, the UE 75 transmits to the Node B realizing the femtocell 74 a request to set up a wireless link between the UE 75 and the Node B realizing the femtocell 74.

In step S44, when the Node B realizing the femtocell 74 receives from the UE 75 the request to set up a wireless link, the Node B realizing the femtocell 74 captures one or more wireless resources which are allocated to the UE 75.

In step S45, the UE 75 receives from the Node B realizing the femtocell 74 a command to set up a wireless link, and manages the one or more wireless resources (of which the UE 75 is informed by the Node B realizing the femtocell 74) in accordance with the command.

In step S46, the UE 75 returns to the Node B realizing the femtocell 74 a response to the command to set up a wireless link.

In step S47, the Node B realizing the femtocell 74 and the UE 75 complete processing for establishing the wireless link.

In step S48, the Node B realizing the femtocell 74 and the UE 75 perform processing for authentication and concealment. For example, the Node B realizing the femtocell 74 confirms whether or not the UE 75 is a valid UE. In addition, the Node B realizing the femtocell 74 and the UE 75 perform processing for realizing concealed communication between the UE 75 and the Node B realizing the femtocell 74.

In step S49, the UE 75 transmits a call-connection request to the Node B realizing the femtocell 74.

In step S50, the UE 75 and the Node B realizing the femtocell 74 perform processing for establishing a wireless access line between the UE 75 and the Node B realizing the femtocell 74 for transmitting user data therebetween. At this time, the transmission rate is tentatively set at a certain level (e.g., the lowest level) since the transmission rate should be determined by a device at an upper protocol layer (such as the core-network device (e.g., an exchange) or a device operating in accordance with the Internet protocol) on the basis of a service contract with the user.

In step S51, the Node B realizing the femtocell 74 returns to the UE 75 a call-connection response.

In step S52, the UE 75 and the Node B realizing the femtocell 74 complete the processing for establishing the wireless access line between the UE 75 and the Node B realizing the femtocell 74.

In step S53, the user presses down the call button, so that the UE 75 starts wireless communication.

In step S54, the Node B realizing the femtocell 74 receives a communication-start request from the UE 75, and sets up a communication path for exchanging user data with the opposite party through the CN and the Internet.

In step S55, the UE 75 starts the communication with the opposite party.

As explained above, when the UE 75 enters the area covered by the femtocell 74, a wireless link and a wireless access line are established. Therefore, when the UE 75 initiates a call to the opposite party, the UE 75 can start communication with the opposite party by only establishing a communication path to the opposite party without performing operations of establishing a wireless link and a wireless access line between the UE 75 and the femtocell 74. Therefore, it is possible to reduce the time taken to start the communication after the user of the UE 75 requests the start of the communication.

5. Variation of Second Embodiment

As in the third embodiment of the present invention which is a variation of the first embodiment in which the collapsed type is employed, the Collapsed type may be employed in the second embodiment. In this case, the configuration of FIG. 10 can be used. When the UE 75 enters the area covered by the femtocell 74, the Node B realizing the femtocell 74 detects the existence of the UE 75 in the area covered by the femtocell 74 on the basis of the registered location of the UE 75, and transmits to the UE 75 a request to establish a wireless link in advance. Thereafter, operations similar to the operations in steps S43 to S55 in FIG. 12 are performed.

6. Additional Matters

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless terminal comprising:
   a receiver which receives information being broadcasted from a wireless base station;
   a transmitter which changes determination of when to transmit to the wireless base station a request to secure one or more wireless resources depending on the information received by the receiver, wherein the request is to be transmitted regardless of calls from or to the wireless terminal when the received information indicates that the wireless base station is of a femtocell, while the request is to be transmitted in response to a call from or to the wireless base station when the received information indicates that the wireless base station is of a cell other than femtocell; and
   a wireless resource receiver which receives and maintains the one or more wireless resources from the wireless base station at least until the wireless terminal initiates a call when the received information indicates that the wireless base station is of a femtocell;
   wherein, when the wireless terminal is operated to initiate a call, the wireless terminal performs operations for establishing a communication path by using the one or more wireless resources that have been received and maintained, where the operations do not include an operation for securing the one or more wireless resources.

* * * * *